US012651757B2

(12) United States Patent
Kemmer et al.

(10) Patent No.: US 12,651,757 B2
(45) Date of Patent: Jun. 9, 2026

(54) HEAT EXCHANGER SYSTEM FOR OPERATING A FUEL CELL STACK

(71) Applicant: Robert Bosch GmbH, Stuttgart (DE)

(72) Inventors: Helerson Kemmer, Vaihingen (DE);
Jochen Braun, Heimsheim (DE)

(73) Assignee: Robert Bosch GmbH, Stuttgart (DE)

( * ) Notice: Subject to any disclaimer, the term of this patent is extended or adjusted under 35 U.S.C. 154(b) by 559 days.

(21) Appl. No.: 18/007,793

(22) PCT Filed: May 21, 2021

(86) PCT No.: PCT/EP2021/063675
§ 371 (c)(1),
(2) Date: Dec. 2, 2022

(87) PCT Pub. No.: WO2021/244881
PCT Pub. Date: Dec. 9, 2021

(65) Prior Publication Data
US 2023/0231159 A1 Jul. 20, 2023

(30) Foreign Application Priority Data
Jun. 3, 2020 (DE) .................... 10 2020 206 918.2

(51) Int. Cl.
*H01M 8/0432* (2016.01)
*H01M 8/04014* (2016.01)
(Continued)

(52) U.S. Cl.
CPC .... *H01M 8/04014* (2013.01); *H01M 8/04111* (2013.01); *H01M 8/04335* (2013.01); *H01M 8/04753* (2013.01)

(58) Field of Classification Search
CPC ......... H01M 8/04014; H01M 8/04111; H01M 8/04335; H01M 8/04753; H01M 2250/20; H01M 8/04029; Y02E 60/50; Y02T 90/40
(Continued)

(56) References Cited

U.S. PATENT DOCUMENTS 5,083,425 A * 1/1992 Hendriks .......... H01M 8/04089
60/683
9,014,791 B2 * 4/2015 Held ........................ F02C 3/34
600/476
(Continued)

FOREIGN PATENT DOCUMENTS

CN 1778009 A 5/2006
DE 69025496 T2 10/1996
(Continued)

OTHER PUBLICATIONS

Translation of International Search Report for Application No. PCT/EP2021/063675 dated Aug. 17, 2021 (2 pages).

*Primary Examiner* — Christian Roldan
(74) *Attorney, Agent, or Firm* — Michael Best & Friedrich LLP

(57) ABSTRACT
The invention relates to a heat exchanger system for operating a fuel cell stack, comprising: —a first compressor and a second compressor for the cathode gas fed to the fuel cell stack, the second compressor being fluidically downstream of the first compressor; —a turbine, which is mechanically coupled to the second compressor and against which the cathode gas discharged from the fuel cell stack flows; —a first heat exchanger, which is thermally coupled to the fed cathode gas between the first compressor and the second compressor; —a second heat exchanger, which is thermally coupled to the fed cathode gas downstream of the second compressor; —a fourth heat exchanger, which is thermally coupled to the discharged cathode gas downstream of the
(Continued)

turbine; wherein the fourth heat exchanger is thermally variably coupled to the first heat exchanger and to the second heat exchanger in order to control a heat exchange for cooling the first heat exchanger and the second heat exchanger.

9 Claims, 7 Drawing Sheets

(51) Int. Cl.
  *H01M 8/04111*          (2016.01)
  *H01M 8/04746*          (2016.01)

(58) Field of Classification Search
  USPC ......................................................... 429/435
  See application file for complete search history.

(56)                    References Cited

U.S. PATENT DOCUMENTS

| | | | | |
|---|---|---|---|---|
| 2004/0241514 A1* | 12/2004 | Tsuji | ................ | H01M 8/04022 |
| | | | | 429/441 |
| 2006/0237583 A1 | 10/2006 | Fucke et al. | | |
| 2013/0022888 A1* | 1/2013 | Vollmer | ........... | H01M 8/04067 |
| | | | | 429/434 |

FOREIGN PATENT DOCUMENTS

| | | | | | |
|---|---|---|---|---|---|
| DE | 102010008210 A1 | | 8/2011 | | |
| DE | 102018202906 A1 | * | 8/2019 | ........ | H01M 8/04029 |
| DE | 102018205995 A1 | | 10/2019 | | |
| JP | S58165977 U | | 11/1983 | | |
| JP | 2005015910 A | | 1/2005 | | |
| JP | 2005135910 A | | 5/2005 | | |
| JP | 2006127861 A | | 5/2006 | | |
| JP | 2010020924 A | | 1/2010 | | |

* cited by examiner

HEAT EXCHANGER SYSTEM FOR OPERATING A FUEL CELL STACK

BACKGROUND OF THE INVENTION

Hydrogen-based fuel cells are considered to be the basis for a mobility concept of the future since they emit only water and allow rapid refueling times. For example, PEM (proton exchange membrane) fuel cells can be operated in an electrocatalytic electrode process with air containing oxygen as the oxidizing agent fed to the cathode of the fuel cell and with hydrogen as the fuel fed to the anode of the fuel cell in order to provide electrical energy with high efficiency.

The compressed cathode gas can reach temperatures of up to 200° C. In order to protect downstream components, such as a cathode gas humidifier or the fuel cell stack itself, the cathode gas must be cooled to <120° C. by means of a heat exchanger, such as a "charge air cooler".

SUMMARY OF THE INVENTION

Using a plurality of heat exchangers in the supplied or discharged cathode gas, it is possible to relieve the load on a main cooling circuit of the fuel cell stack, to increase efficiency of exhaust gas enthalpy recuperation by means of a turbine, to improve efficiency of a second compressor stage by means of intermediate cooling, and to protect the fuel cell stack against excessively high air inlet temperatures. In this context, the extent of these effects must be optimized for a respective operating state of the fuel cell stack.

According to aspects of the invention, a heat exchanger system for operating a fuel cell stack, a method for controlling the heat exchanger system, use of the heat exchanger system, a computer program and a machine-readable storage medium are proposed according to the features of the independent claims, and these at least partially achieve the objects described. Advantageous embodiments form the subject matter of the dependent claims and of the following description.

The invention is based on the insight that, by means of suitable thermally variable coupling between the heat exchangers of the heat exchanger system, the temperatures of the supplied and/or discharged cathode gas can be optimized for different operating conditions of the fuel cell stack.

According to one aspect, a heat exchanger system for operating a fuel cell stack is proposed, which has a first compressor and a second compressor for the cathode gas fed to the fuel cell stack, wherein the second compressor is arranged fluidically downstream of the first compressor. The heat exchanger system furthermore has a turbine, which is mechanically coupled to the second compressor and against which the cathode gas discharged from the fuel cell stack flows. Furthermore, the heat exchanger system has a first heat exchanger, which is thermally coupled to the supplied cathode gas between the first compressor and the second compressor and, in addition, a second heat exchanger, which is thermally coupled to the supplied cathode gas downstream of the second compressor and, furthermore, a fourth heat exchanger, which is thermally coupled to the discharged cathode gas downstream of the turbine, wherein the fourth heat exchanger is thermally variably coupled to the first heat exchanger and the second heat exchanger in order to control a heat exchange for cooling the first heat exchanger and the second heat exchanger.

Such variable thermal coupling can be achieved by means of gas-coolant heat exchangers, by means of the exchange of the coolant between the heat exchangers, by means of gas-gas heat exchangers, by means of the exchange of gas flows between the heat exchangers or other thermal couplings between the heat exchangers, such as by means of differently heat-conducting materials or variable contact surfaces, for heat exchange between the heat exchangers. Variable thermal coupling can be understood, in particular, to mean thermal coupling which can be changed during ongoing operation, but also, in addition, thermal coupling which allows thermal couplings within the heat exchanger system to be set in a structurally variable manner. The latter, in particular, by using restrictors in fluid flows, contact surfaces between heat exchangers, etc.

Here, direction indications refer to a direction of the fluids concerned.

With such a heat exchanger system, it is possible, in particular, to optimize a temperature of cathode gas flows within the heat exchanger system.

In particular, variable thermal coupling enables a temperature of the cathode gas between the first compressor and the second compressor to be brought to a temperature level which is as low as possible in order to achieve better efficiency of the second compressor, which also results in a relief of the electrical compression system. By virtue of the fact that less energy has to be expended for compression, a power of the fuel cell stack can be reduced, resulting in reduced costs.

Advantageously, the result of variable thermal coupling is that the cooling of the cathode gas downstream the second compressor can be brought to a temperature level which is as low as possible in order to enable particularly good protection of the fuel cell stack against thermal degradation and thus an increase in the service life. In addition, the main cooling circuit is advantageously relieved since some of the cooling power is achieved with the cathode air.

The fourth heat exchanger advantageously has the effect that the discharged cathode gas is heated to a higher temperature level upstream of an exhaust in order to reduce water droplets from the exhaust.

According to one aspect, it is proposed that the heat exchanger system has a third heat exchanger, which is thermally coupled to the discharged cathode gas in the fluid direction upstream of the turbine, and wherein the first heat exchanger and the second heat exchanger are thermally variably coupled to the third heat exchanger in order to control a heat exchange for heating the third heat exchanger.

With the thermally variable coupling, heating of the discharged cathode gas upstream of the turbine to the highest possible temperature level can be optimized in order to bring about better efficiency of the turbine and thereby relief of the electrical compression system. Here too, by means of the reduced electrical power required for compression of the cathode gas, it is possible to reduce the power of the fuel cell stack, and this can also result in a reduction in costs.

According to one aspect, it is proposed that the fourth heat exchanger is thermally variably coupled to both the first heat exchanger and the second heat exchanger by means of a coolant and a first three-way valve in order to cool the cathode gas upstream and downstream of the second compressor.

The coolant cooled by the first heat exchanger can be divided up by the three-way valve in such a way that both the cathode gas downstream of the first heat exchanger and that downstream of the second heat exchanger are cooled down to about 70° C.

According to one aspect, it is proposed that the first heat exchanger and the second heat exchanger are thermally variably coupled to the third heat exchanger by means of a coolant and a second three-way valve in order to supply heat to the discharged cathode gas upstream of the turbine.

A second three-way valve allows optimum mixing of the coolant flows from the first and second heat exchangers, thus enabling the third heat exchanger to bring the discharged cathode gas from the fuel cell stack to a high temperature level.

According to one aspect, it is proposed that the second heat exchanger is thermally coupled to the third heat exchanger by means of a coolant in order to supply heat to the discharged cathode gas upstream of the turbine.

In other words, the direct fluidic coupling of the coolant between the second and third heat exchangers achieves particularly direct thermal coupling, which can be set, for example, by means of an adjustable restrictor in the fluidic connection or a diameter of the fluidic connection between the two heat exchangers.

It is thereby possible to increase the temperature upstream of the turbine in order to improve the efficiency of the turbine.

According to one aspect, it is proposed that the heat exchanger system has a coolant pump, and the thermal coupling by means of the coolant is configured to bring about a flow of the coolant between the first to fourth heat exchangers by means of the coolant pump.

According to one aspect, it is proposed that the heat exchanger system has a fifth heat exchanger, which is thermally coupled to the discharged cathode gas in the fluid direction upstream of the third heat exchanger and is thermally coupled to the first heat exchanger in order to absorb heat. In this case, it is possible, in particular, for the coupling between the first heat exchanger and the fifth heat exchanger to be set up to be thermally variable.

According to one aspect, it is proposed that the fifth heat exchanger is thermally coupled to the first heat exchanger by means of the coolant.

According to one aspect, it is proposed that a thermal coupling to a cooler assembly is inserted between the thermal coupling of the fourth heat exchanger to the first and the second heat exchanger.

It is thus possible to ensure that further assemblies are also cooled in an optimized manner.

According to one aspect, it is proposed that the cooler assembly has a power electronics cooler and/or an inverter cooler and/or a motor cooler and/or a converter cooler.

The rotor-shaft units, as an example of a motor cooler, which may be either electric-motor-driven or turbine-driven, have to be cooled on account of losses or friction in the rotor-shaft system, for example bearing losses due to the high rotational speeds.

The coolers listed here can be thermally coupled either in series or in parallel as well as partially in series and partially in parallel.

Since the power electronics, in particular, but also the rotor-shaft units require a low temperature level, the lowest temperature level of the heat exchanger system can be used to cool first the power electronics and then the rotor-shaft units. That is to say that both sequential interconnection and parallel interconnection of the thermal coupling are possible.

Further heat sources can thus advantageously be integrated into the overall concept of the heat exchanger system with optimization as a whole.

Moreover, there is the possibility of structural integration into an air module which contains the air compression components as well as the heat exchanger components of the heat exchanger system in both a compact and an integrated manner.

Furthermore, there may be advantages with respect to a necessary installation space since no separate connections to a further cooling system are required for cooling the power electronics or the rotor-shaft unit, i.e. the motor cooling system.

A method for controlling a heat exchanger system described above is proposed, wherein the heat exchanger system has a first temperature sensor and a second temperature sensor, and the first temperature sensor is arranged to measure a temperature of the supplied cathode gas upstream of the second compressor, and the second temperature sensor is arranged to measure a temperature of the discharged cathode gas upstream of the turbine. In this case, the first and/or second three-way valve are/is controlled in such a way that the temperature of the second temperature sensor becomes maximum and/or the temperature of the first temperature sensor becomes minimum.

The invention proposes the use of a heat exchanger system described above for supplying a mobile platform with electrical energy.

A mobile platform can be an at least partially automated system that is mobile, and/or can be a driver assistance system. One possible example is an at least partially automated vehicle or a vehicle having a driver assistance system. That is to say, in this context, that an at least partially automated system includes a mobile platform in respect of at least partially automated functionality, but a mobile platform also includes vehicles and other mobile machines, including driver assistance systems. Further examples of mobile platforms can be driver assistance systems with a plurality of sensors, mobile multi-sensor robots such as robot vacuum cleaners or lawnmowers, a multi-sensor monitoring system, a production machine, a personal assistant or an access control system. Each of these systems can be a completely or partially autonomous system.

Since effective use of electrical energy is relevant for the operation of a fuel cell system, particularly in the case of mobile platforms, the advantages of such a system are evident particularly in the electrical supply of a mobile platform.

The described heat exchanger system for operating a fuel cell stack can also be used for stationary applications.

The invention proposes a computer program comprising instructions which, when the program is executed by a computer, cause the computer to execute one of the above-described methods. A computer program of this kind makes it a simple matter to use the method described in different systems.

A machine-readable storage medium on which the computer program described above is stored is indicated.

BRIEF DESCRIPTION OF THE DRAWINGS

Exemplary embodiments of the invention are explained in greater detail below with reference to FIGS. 1 to 7. Here.

DETAILED DESCRIPTION

Figure 1:
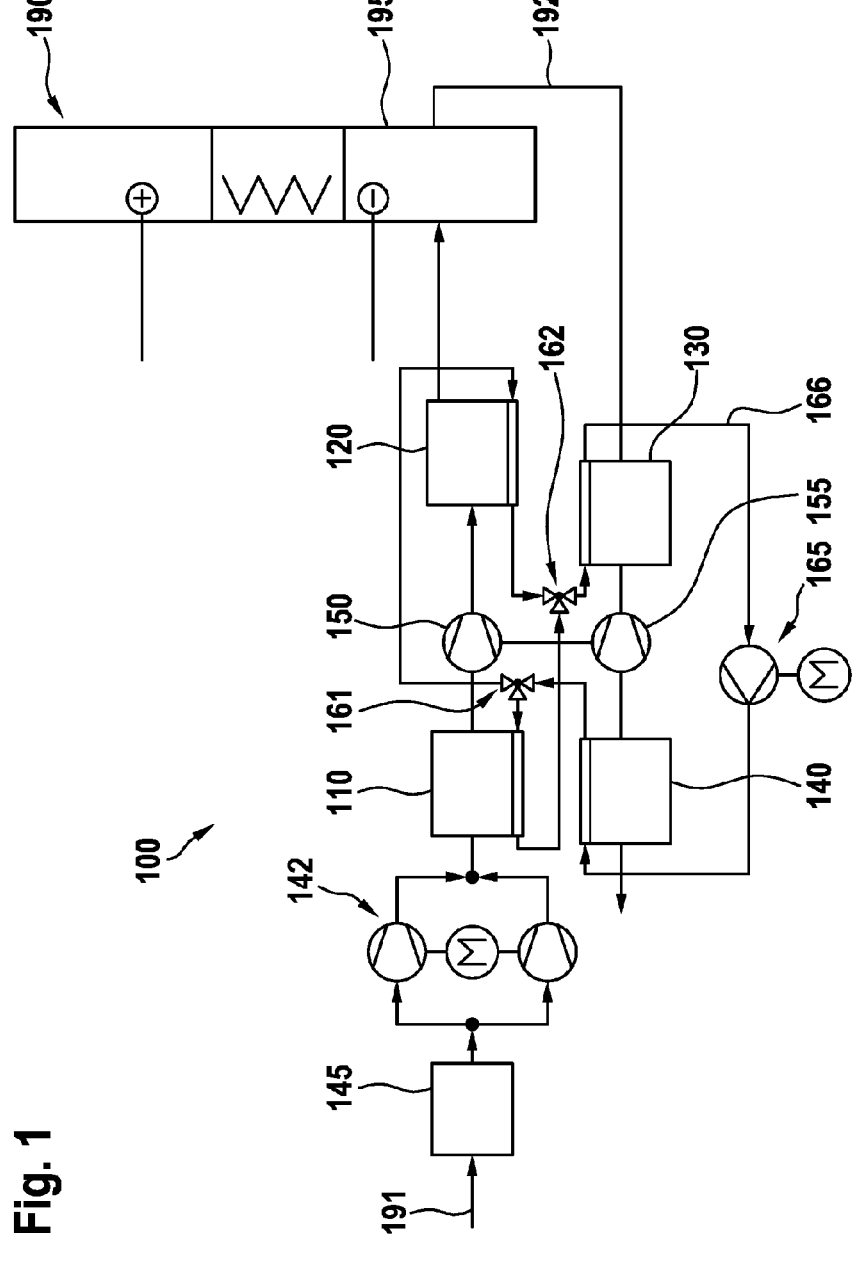
FIG. 1 shows a heat exchanger system for operating a fuel cell stack.

FIG. 1 outlines a heat exchanger system 100 for operating a fuel cell stack having a cathode side 195 of the fuel cell stack 190, a first compressor 142 and a second compressor 150, which is mechanically coupled to a turbine 155.

In a cathode path, a cathode gas is fed to the upstream cathode side 195 of the fuel cell stack 190 and is passed into the environment downstream of the cathode side 195.

Upstream, to supply the cathode side 195 of the fuel cell stack 190, air is passed as a cathode gas from the environment 191 via an air filter 145 in order to filter harmful particles and, in particular, harmful chemical compounds out of the air. By means of a first compressor 142, which is driven by a motor M, a cathode gas flow of the filtered air is fed to a first heat exchanger 110, which is thermally coupled to the cathode gas flow. The first heat exchanger 110 absorbs heat from the compressed cathode gas flow in order to cool the cathode gas heated by the first compressor 142 before the second compression by means of a second compressor 150 so as to increase the efficiency of the compression process on the cathode gas flow. This heat is coupled by the first heat exchanger 110 to a coolant thermally coupled to the first heat exchanger 110. The cooled cathode gas flow is fed to the second compressor 150 so as to be further compressed.

By means of the second compressor 150, which is driven without a motor for example, the further compressed cathode gas flow is fed to a second heat exchanger 120, which is thermally coupled to the further compressed cathode gas flow.

The second heat exchanger 120 absorbs heat from the further compressed cathode gas flow so as to cool the cathode gas heated by the second compressor 150 in order to control an inlet temperature of the cathode gas flow into the cathode side 195 of the fuel cell stack 190. This heat is coupled by the second heat exchanger 120 to the coolant thermally coupled to the first heat exchanger 120. This cathode gas flow, which is cooled once again, is passed to an inlet connection of the cathode side 195 of the fuel cell stack 190.

Downstream of the fuel cell stack 190, the cathode gas flow is fed via an outlet connection 192 to the cathode side 195 of the fuel cell stack 190, to a third heat exchanger 130, which is thermally coupled to the cathode gas flow discharged from the cathode gas side 195 of the fuel cell stack 190.

The third heat exchanger 130 dissipates heat to the discharged cathode gas flow to heat the discharged cathode gas flow so that a temperature of the discharged cathode gas flow is increased for effective operation of the turbine arranged downstream. This heat is coupled by the third heat exchanger 130 out of the coolant thermally coupled to the third heat exchanger 130. This heated discharged cathode gas flow is passed to the turbine 155 to operate the turbine 155 for recuperation of energy from the discharged cathode gas flow.

From the turbine 155, the expanded cathode gas flow is fed to a fourth heat exchanger 140, which is thermally coupled to the expanded cathode gas flow.

The fourth heat exchanger 140 is thermally coupled to the coolant and dissipates heat from the coolant to the expanded cathode gas flow to lower the temperature of the coolant.

The cathode gas flow which is heated in this manner, flows downstream of the cathode side 195 of the fuel cell stack 190 and emerges from the fourth heat exchanger 140 is then discharged into the environment of the fuel cell stack 190.

The cooled coolant which emerges from the fourth heat exchanger 140 is fed to both the first heat exchanger 110 and the second heat exchanger 120 via a first three-way valve 161, and, via the controllable three-way valve 161, can provide thermally variable coupling of the fourth heat exchanger 140 to the first heat exchanger 110 and the second heat exchanger 120.

The heated coolant which emerges from the first heat exchanger 110 and the second heat exchanger 120 is fed to the third heat exchanger 130 via a second controllable three-way valve 162 and can thereby provide thermally variable coupling of the first heat exchanger 110 and the second heat exchanger 120 to the third heat exchanger 130. Thus, by means of control of the first three-way valve 161 and of the second three-way valve 162, the heat exchange between the heat exchangers can be controlled in such a way that the heat exchange can be optimized for different operating conditions of the fuel cell stack.

By means of a coolant pump 165, which fluidically connects the coolant outlet of the coolant of the third heat exchanger 130 to the coolant inlet of the fourth heat exchanger 140, the coolant in the coolant circuit described can be recirculated and thus exchanged. The cooling circuit is thus closed. The coolant pump 165 can also be installed in a different position, e.g. between heat exchanger 140 and three-way valve 161.

In this case, all the heat exchangers 110, 120, 130, 140 can be operated with the coolant on the countercurrent principle in relation to the cathode gas flow.

Figure 2:
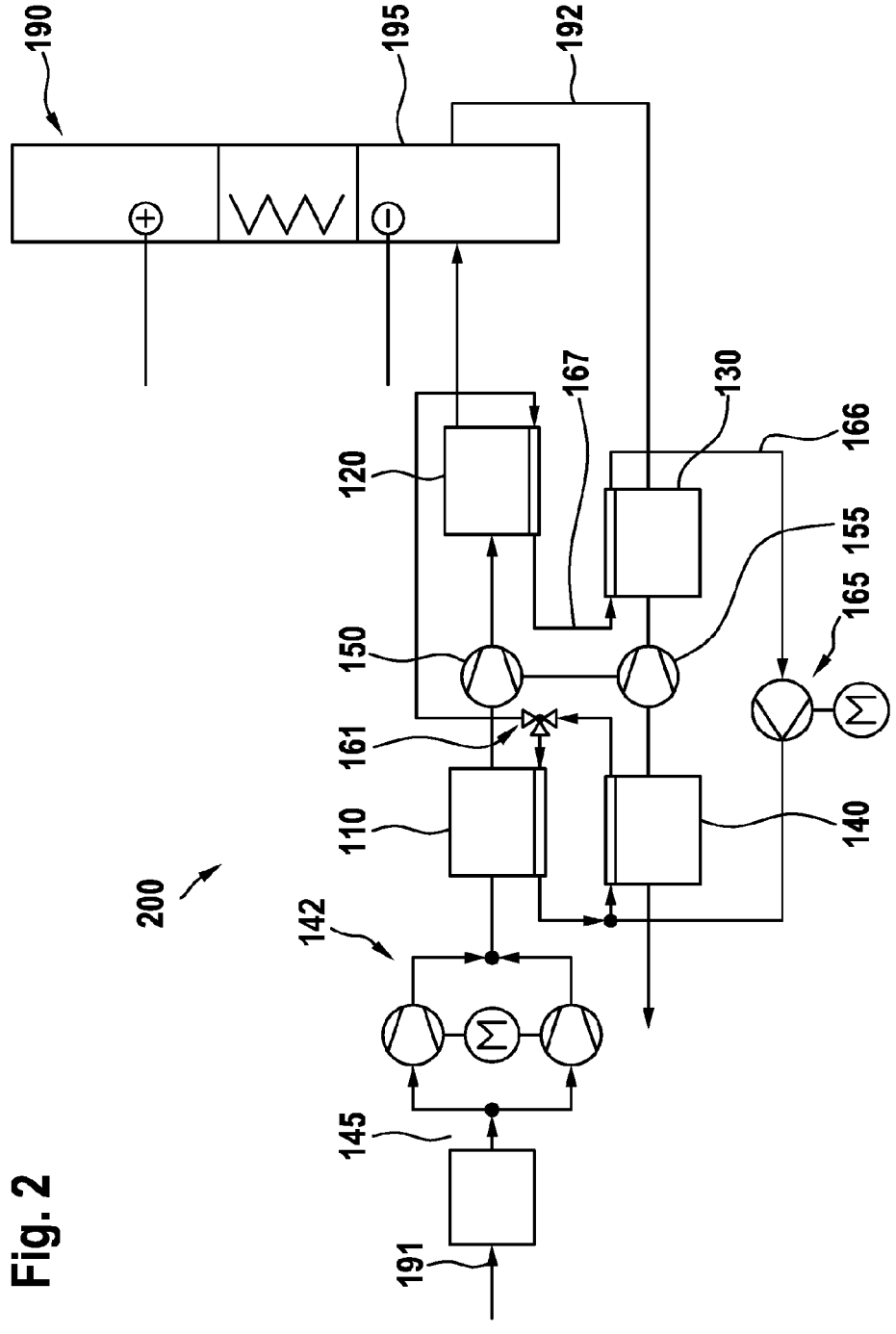
FIG. 2 shows a modification of the heat exchanger system for operating a fuel cell stack.

FIG. 2 outlines a heat exchanger system 200 as a modification of the previously described heat exchanger system 100, in which the coolant outlet of the second heat exchanger 120 is connected directly to the coolant inlet of the third heat exchanger via a fluidic connection 167. Since this modified heat exchanger system 200 has only a first three-way valve 161, the coolant outlet of the first heat exchanger 110 is coupled directly to the coolant inlet of fourth heat exchanger 140 in the diagram. Thus, the variable thermal coupling between the fourth heat exchanger 140 and the first heat exchanger 110 as well as the second heat exchanger 120 can be provided in heat exchanger system 200 by means of the first three-way valve 161.

Figure 3:
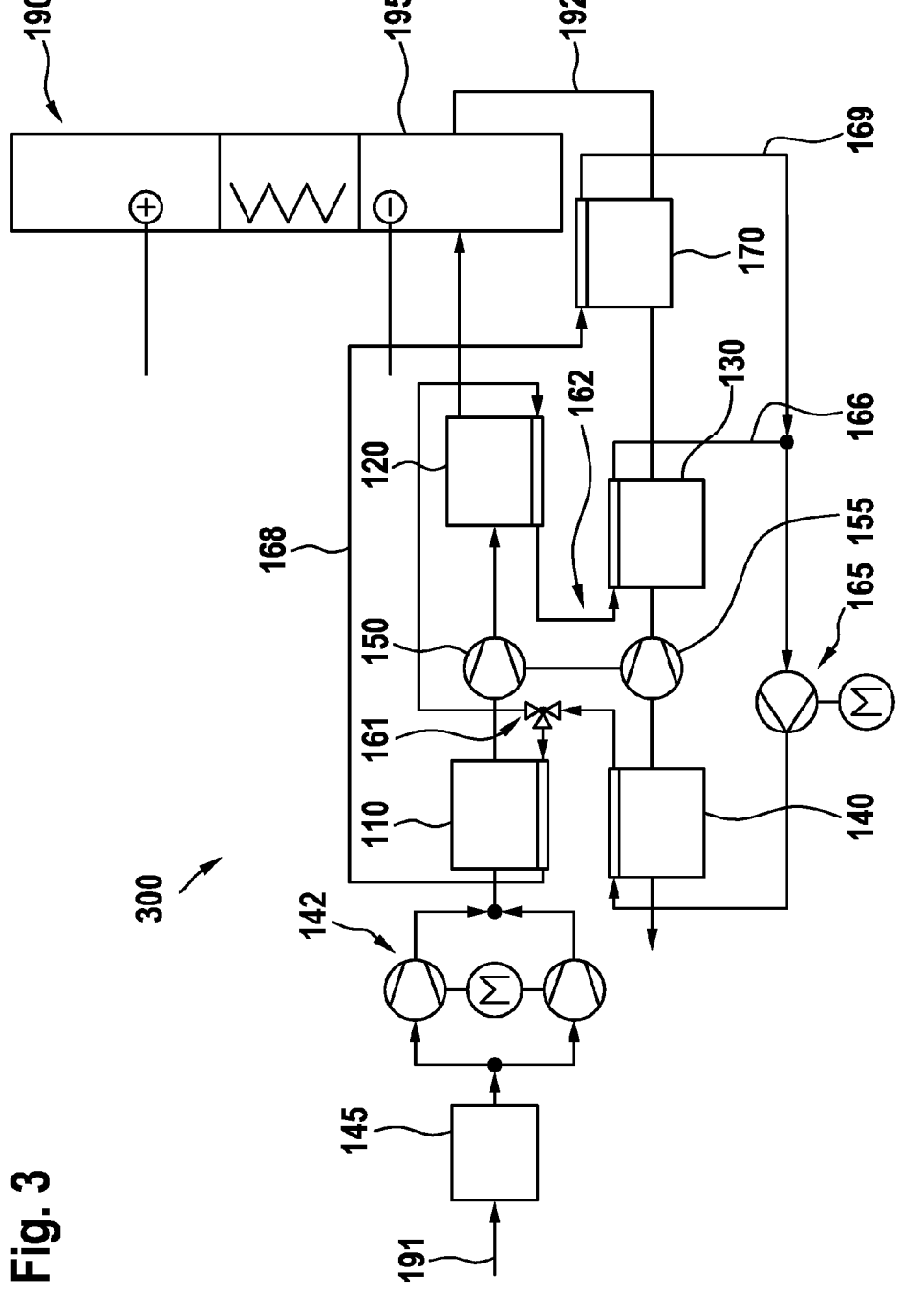
FIG. 3 shows another modification of the heat exchanger system for operating a fuel cell stack.

FIG. 3 outlines a heat exchanger system 300 which, as a modification of the system 200 described in FIG. 2, has a fifth heat exchanger 170, which is thermally coupled to the discharged cathode gas in the fluid direction upstream of the third heat exchanger and is thermally coupled to the first heat exchanger in order to absorb heat. This thermal coupling is achieved by a fluidic connection of the coolant outlet of the first heat exchanger 110 to a coolant inlet of the fifth heat exchanger 170, and the coolant outlet is coupled via a fluidic connection 169 both to the coolant outlet 166 of the third heat exchanger 130 and to an inlet of the coolant pump 165. This results in both the coolant flow from the third heat exchanger 130 and from the fifth heat exchanger 170 flowing jointly into the inlet of the coolant pump 165.

Figure 4:
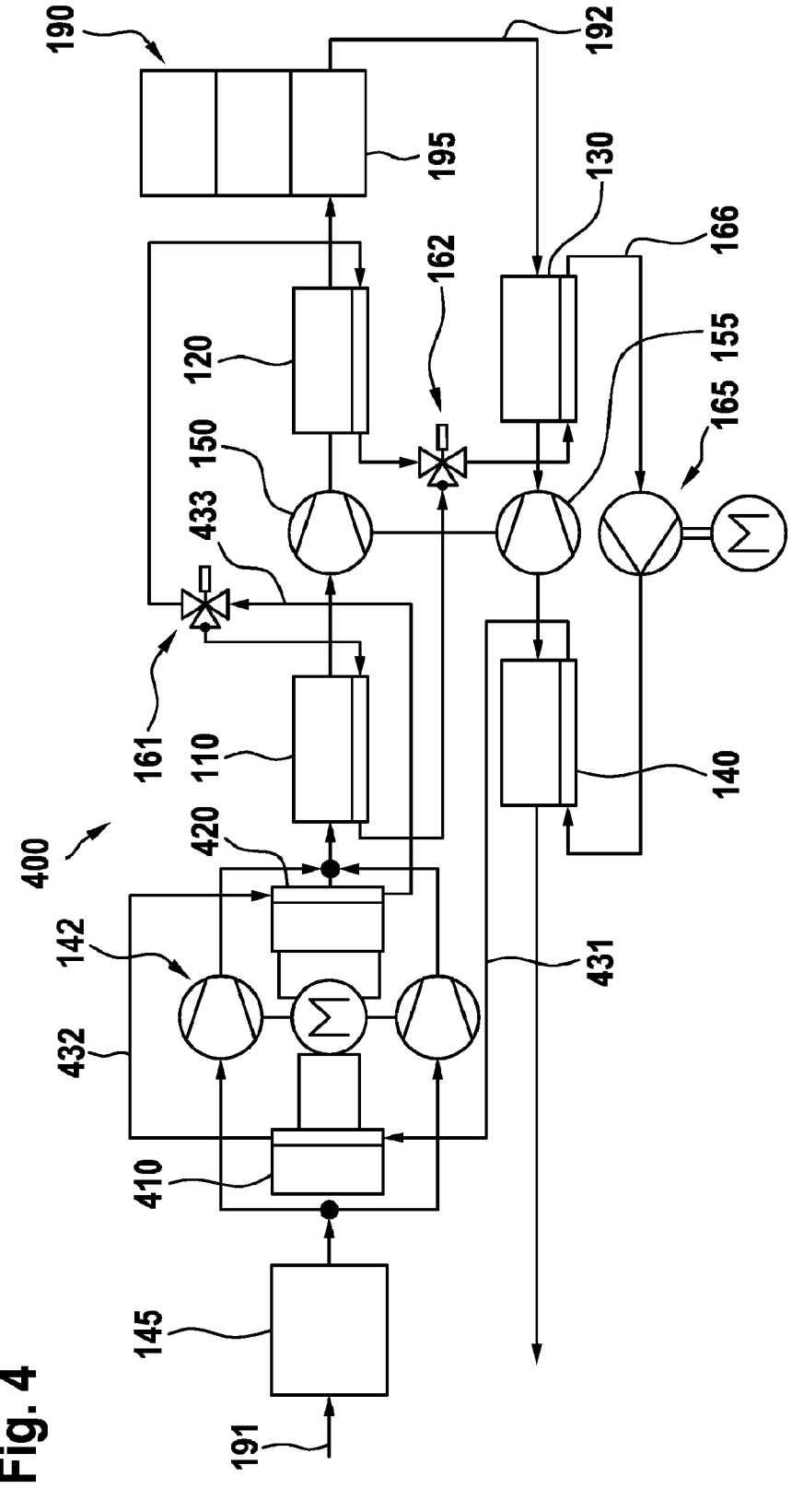
FIG. 4 shows another modification of the heat exchanger system for operating a fuel cell stack.

FIG. 4 outlines a heat exchanger system 400 as a modification of the system 100 described in FIG. 1, in which a thermal coupling to a cooler assembly is inserted between the thermal coupling of the fourth heat exchanger 140 to the first heat exchanger 110 and the second heat exchanger 120. In this case, the cooler assembly has a power electronics cooler and a motor cooler. This thermal coupling in heat exchanger system 400 is achieved in that the coolant outlet of the fourth heat exchanger 140 is first fluidically coupled to the power electronics cooler 410 in order to cool power electronics and is then fluidically coupled to the motor cooler 420 in order to cool the motor. A coolant outlet of the motor cooler 420 is then fluidically coupled to the first three-way valve 161.

Figure 5:
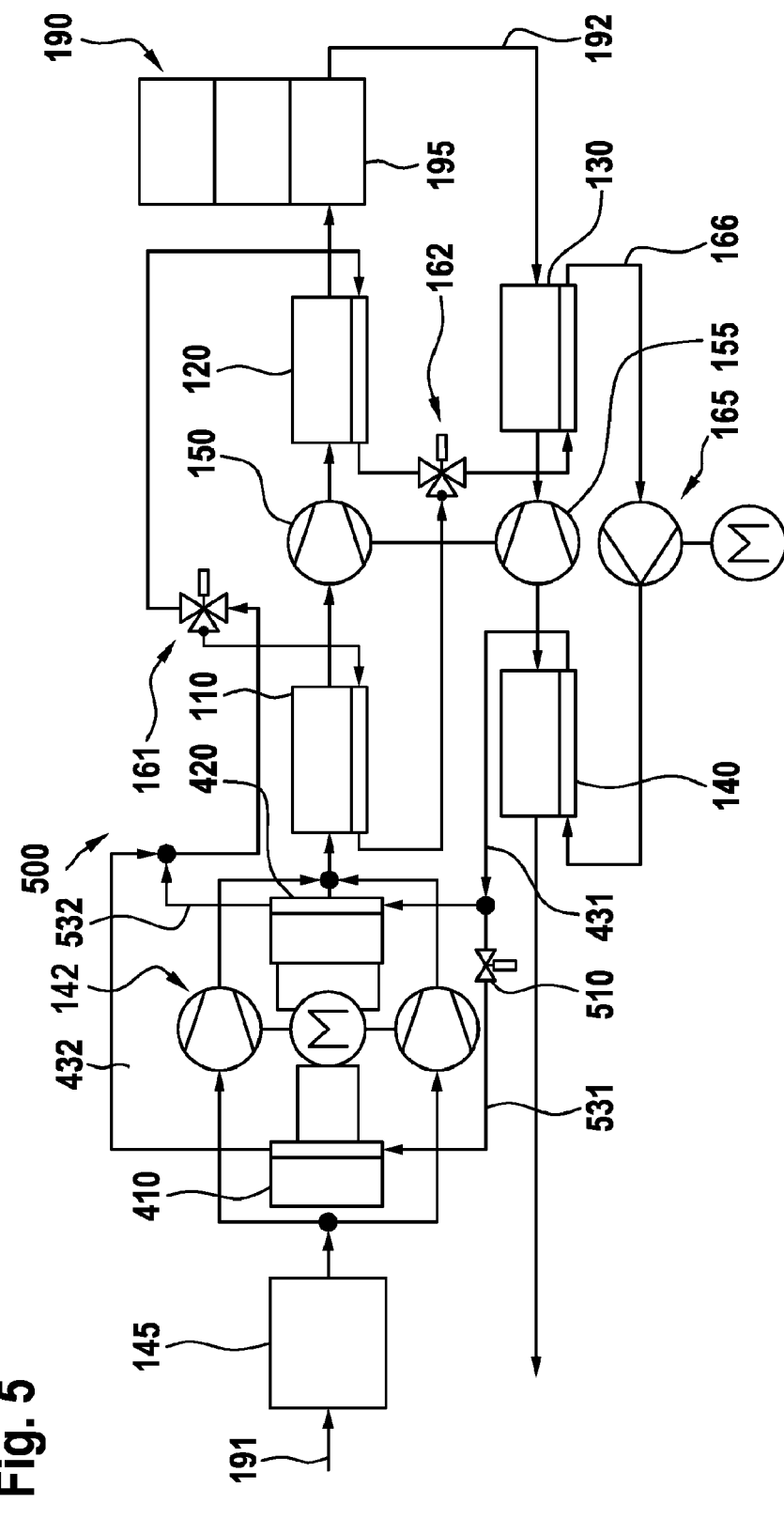
FIG. 5 shows another modification of the heat exchanger system for operating a fuel cell stack.

FIG. 5 outlines a heat exchanger system 500 which, as a modification of the system 400 described in FIG. 4, couples the coolant outlet of the fourth heat exchanger 140 in parallel with the power electronics cooler and with the motor cooler 420. In this case, the fluidic coupling 531 of the power electronics cooler 410 to the fourth heat exchanger 140 has a restrictor 510 in order to adjust the thermal coupling between the power electronics cooler 410 and the motor cooler 420. The two coolant outlets of the power electronics cooler 410 and of the motor cooler 420 are fluidically combined and fed to the first three-way valve 161. The difference with respect to heat exchanger system 400 therefore consists in parallel flow of the coolant through the two coolers 410 and 420.

Figure 6:
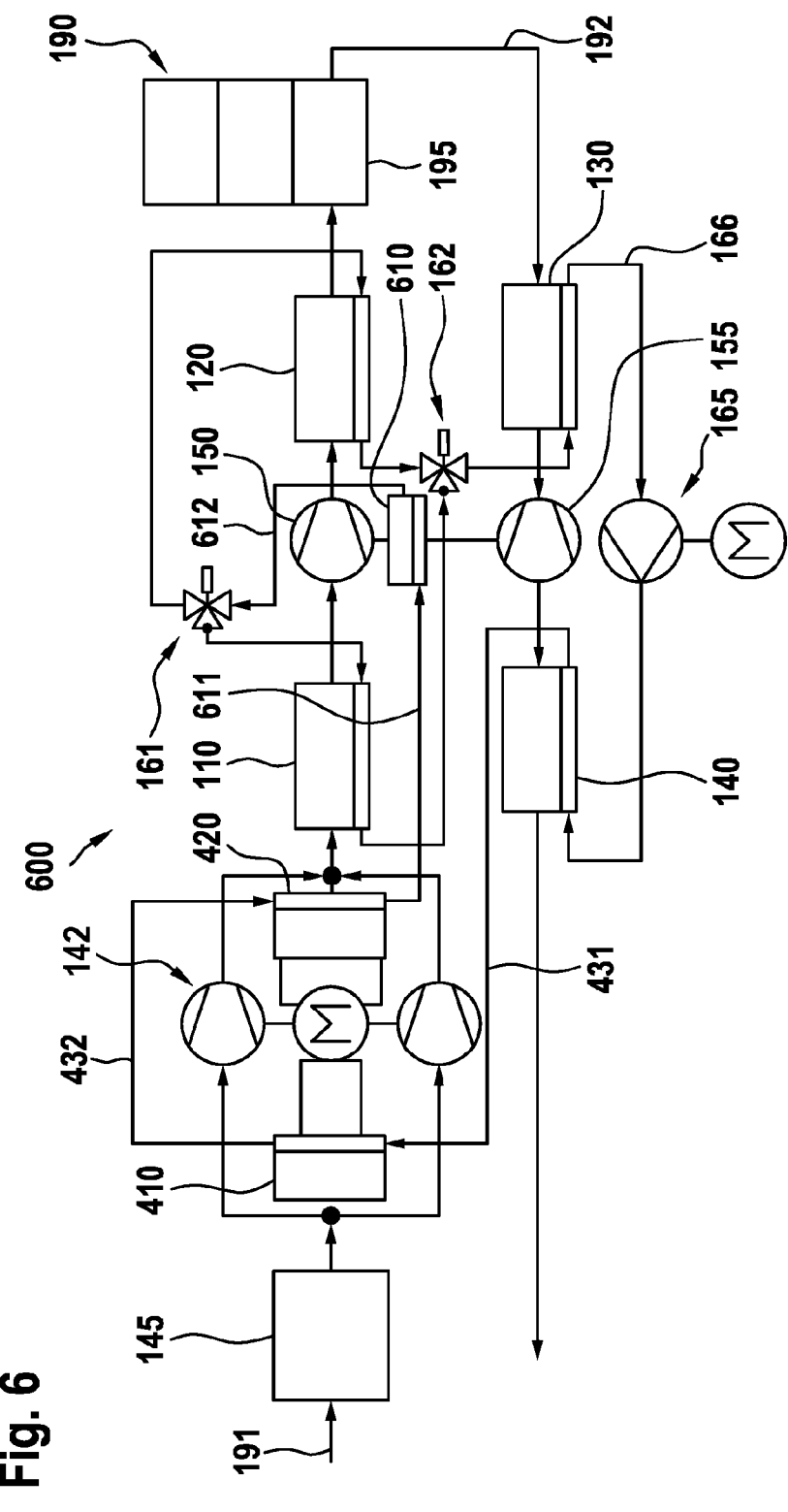
FIG. 6 shows another modification of the heat exchanger system for operating a fuel cell stack.

FIG. 6 outlines a heat exchanger system 600 which, as a modification of the system 400 described in FIG. 4, has a motor cooler 610 for the second compressor 150, which is coupled fluidically and thermally in series between the fourth heat exchanger 140 and the first three-way valve 161. That is to say that the coolant outlet of the motor cooler 420 is fluidically coupled to a coolant inlet of the motor cooler 610, and a coolant outlet of the motor cooler 610 is fluidically coupled to the first three-way valve 161.

Figure 7:
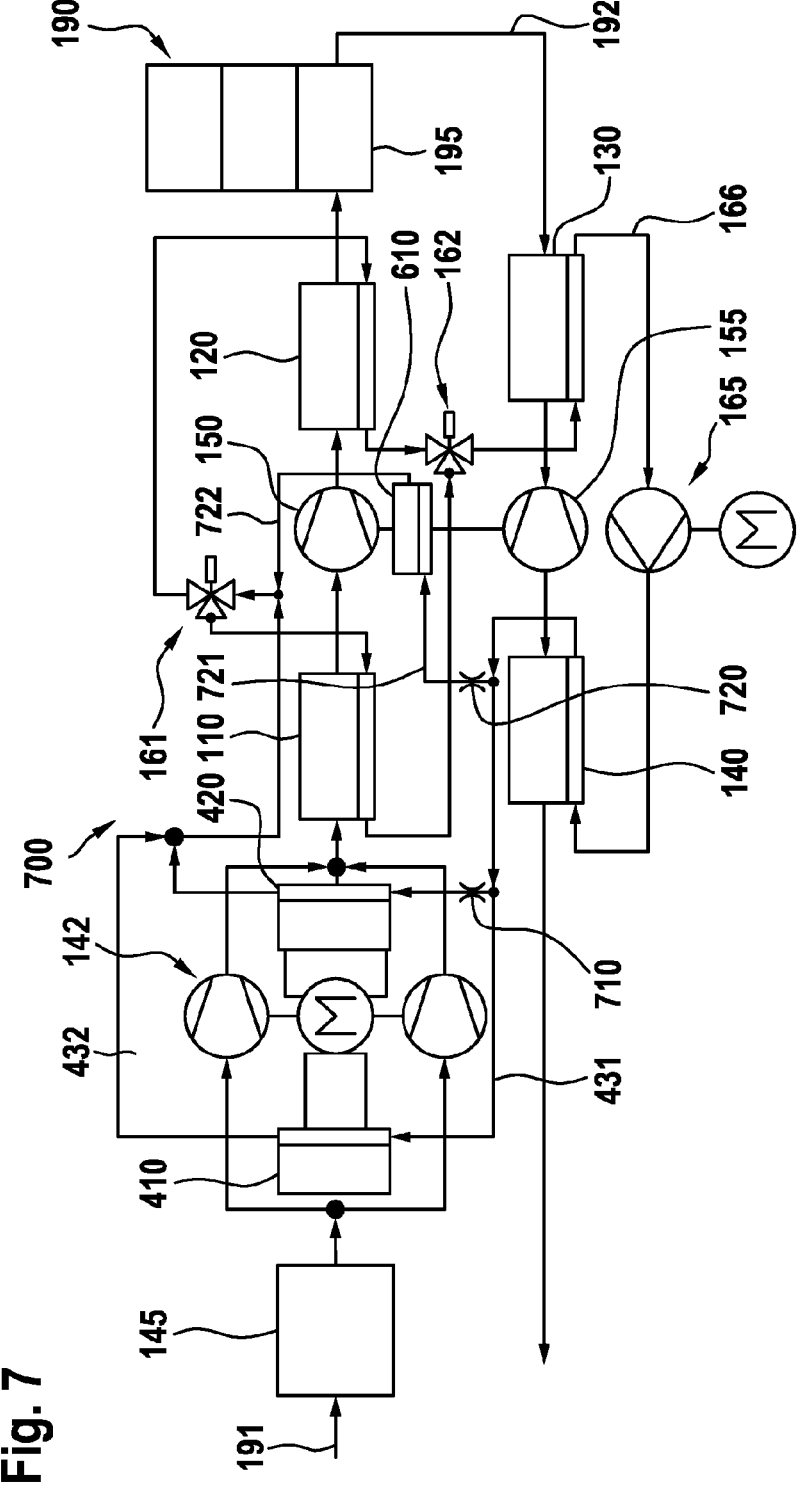
FIG. 7 shows another modification of the heat exchanger system for operating a fuel cell stack.

FIG. 7 outlines a heat exchanger system 700 which, as a modification of the system 500 described in FIG. 5, has fluidically and thermally parallel coupling of the fourth heat exchanger 140 to the power electronics cooler 410 and the motor cooler 420, on the one hand, and to the motor cooler 610 of the second compressor 150, on the other hand. That is to say that the coolant flow which emerges from the coolant outlet of the fourth heat exchanger is fed, on the one hand, into the fluidically parallel coupling of the power electronics cooler 410 and of the motor cooler 420 and, on the other hand, is fed fluidically in parallel through the motor cooler 610 of the second compressor 150, and the respective coolant branch which runs in parallel is brought together at the first three-way valve 161. In this case, the coolant flow can be divided between the coolant branches running in parallel by means of a first restrictor 710, which is arranged in a coolant feed to the motor cooler 420, and a second restrictor 720, which is arranged in a coolant feed from the fourth heat exchanger 140 and the motor cooler 610 of the second compressor 150, and thus the thermal coupling in the two coolant branches can be adjusted.

A person skilled in the art will recognize that, in addition to the topologies of the heat exchanger system for operating a fuel cell stack which are illustrated here, the teaching of the invention can also be implemented using other topologies. Such as, for example, with an air system with multiple compression or some other circuit of pumps and valves.

The invention claimed is:

1. A heat exchanger system (100, 200, 300, 400, 500, 600, 700) for operating a fuel cell stack (190), the heat exchanger system comprising:

a first compressor (142) and a second compressor (150) for cathode gas supplied to the fuel cell stack (190), wherein the second compressor (150) is arranged fluidically downstream of the first compressor (142);

a turbine (155), which is mechanically coupled to the second compressor (150) and against which cathode gas discharged from the fuel cell stack (190) flows;

a first heat exchanger (110), which is thermally coupled to the supplied cathode gas between the first compressor (142) and the second compressor (150);

a second heat exchanger (120), which is thermally coupled to the supplied cathode gas downstream of the second compressor (150);

a fourth heat exchanger (140), which is thermally coupled to the discharged cathode gas downstream of the turbine (155); wherein the fourth heat exchanger (140) is thermally variably coupled to the first heat exchanger (110) and to the second heat exchanger (120) in order to control a heat exchange for cooling the first heat exchanger (110) and the second heat exchanger (120), and the fourth heat exchanger (140) is thermally variably coupled to both the first heat exchanger (110) and the second heat exchanger (120) by means of a coolant and a first three-way valve (161) in order to cool the supplied cathode gas upstream and downstream of the second compressor (150).

2. The heat exchanger system (100, 200, 300, 400, 500, 600, 700) as claimed in claim 1, comprising: a third heat exchanger (130), which is thermally coupled to the discharged cathode gas in a fluid direction upstream of the turbine (155), and wherein the first heat exchanger (110) and the second heat exchanger (120) are thermally variably coupled to the third heat exchanger (130) in order to control a heat exchange for heating the third heat exchanger (130).

3. The heat exchanger system (100, 200, 400, 500, 600, 700) as claimed in claim 1, wherein the first heat exchanger (110) and the second heat exchanger (120) are thermally variably coupled to a third heat exchanger (130) by means of a coolant and a second three-way valve (162) in order to supply heat to the discharged cathode gas upstream of the turbine (155).

4. The heat exchanger system (100, 200, 300, 400, 500, 600, 700) as claimed in claim 2, wherein the second heat exchanger (120) is thermally coupled to the third heat exchanger (130) by means of a coolant in order to supply heat to the discharged cathode gas upstream of the turbine (155).

5. The heat exchanger system (100, 200, 300, 400, 500, 600, 700) as claimed in claim 1, comprising: a coolant pump (165), and a thermal coupling by means of the coolant is configured to bring about a flow of the coolant between the first to fourth heat exchangers (110, 120, 130, 140) by means of the coolant pump (165).

6. The heat exchanger system (300) as claimed in claim 4, comprising a fifth heat exchanger (170), which is thermally coupled to the discharged cathode gas in the fluid direction upstream of the third heat exchanger (130) and is thermally coupled to the first heat exchanger (110) in order to absorb heat.

7. The heat exchanger system (300) as claimed in claim 6, wherein the fifth heat exchanger (170) is thermally coupled to the first heat exchanger (110) by means of the coolant.

8. The heat exchanger system (400, 500, 600, 700) as claimed in claim 1, wherein a thermal coupling to a cooler assembly is inserted between a thermal coupling of the fourth heat exchanger (140) to the first (110) and the second heat exchanger (120).

9. The heat exchanger system (400, 500, 600, 700) as claimed in claim 8, wherein the cooler assembly has a power electronics cooler (410) and/or an inverter cooler and/or a motor cooler (420) and/or a converter cooler.

* * * * *